(12) United States Patent
Song

(10) Patent No.: US 12,085,269 B1
(45) Date of Patent: Sep. 10, 2024

(54) PROJECTION-BASED DECORATIVE LAMP

(71) Applicant: Keyong Song, Taizhou (CN)

(72) Inventor: Keyong Song, Taizhou (CN)

( * ) Notice: Subject to any disclaimer, the term of this patent is extended or adjusted under 35 U.S.C. 154(b) by 0 days.

(21) Appl. No.: 18/355,582

(22) Filed: Jul. 20, 2023

(30) Foreign Application Priority Data

May 23, 2023 (CN) .......................... 202321289534.1

(51) Int. Cl.
*F21V 3/02* (2006.01)
*G03B 21/20* (2006.01)
*F21W 121/00* (2006.01)

(52) U.S. Cl.
CPC ............ *F21V 3/02* (2013.01); *G03B 21/2013* (2013.01); *F21W 2121/00* (2013.01)

(58) Field of Classification Search
CPC .............................. F21V 3/02; F21W 2121/00
See application file for complete search history.

(56) References Cited

U.S. PATENT DOCUMENTS

| | | | | |
|---|---|---|---|---|
| 7,188,976 B1 * | 3/2007 | Fung | ....................... | F21V 17/04 362/255 |
| 11,435,056 B1 * | 9/2022 | Zhu | ........................ | F21V 3/049 |
| 2009/0080203 A1 * | 3/2009 | McCauley | ............ | F21V 17/002 362/368 |
| 2013/0258706 A1 * | 10/2013 | Urtiga | ..................... | G09F 13/18 362/604 |
| 2014/0268861 A1 * | 9/2014 | Yang | ....................... | F21V 21/14 362/555 |
| 2016/0169463 A1 * | 6/2016 | Gunderson | ............... | F21S 6/00 362/157 |
| 2017/0307965 A1 * | 10/2017 | Sum | ....................... | A63H 3/006 |
| 2022/0065437 A1 * | 3/2022 | Egitto | ................ | F21V 21/0824 |
| 2023/0111641 A1 * | 4/2023 | Zhang | ................... | F21S 10/007 353/87 |

* cited by examiner

*Primary Examiner* — Evan P Dzierzynski
(74) *Attorney, Agent, or Firm* — Westbridge IP LLC

(57) ABSTRACT

A projection-based decorative lamp includes a decorative shell made of a translucent plastic material, and includes a projection assembly, the projection assembly being provided inside the decorative shell. A first projection chamber and a second projection chamber are provided within the projection assembly; the first projection chamber includes a first shape hole formed on a front wall and a first light source formed on a rear wall, and the second projection chamber includes a second shape hole formed on a front wall and a second light source formed on a rear wall; the first light source illuminates the first shape hole to project a first shape onto the decorative shell, and the second light source illuminates the second shape hole to project a second shape onto the decorative shell; a center point of the first shape is the same as a center point of the second shape.

8 Claims, 11 Drawing Sheets

PROJECTION-BASED DECORATIVE LAMP

CROSS-REFERENCE TO RELATED APPLICATIONS

This application claims priority to Chinese Patent Application No. 202321289534.1, filed on May 23, 2023, the content of which is incorporated herein by reference in its entirety.

TECHNICAL FIELD

The present application relates to the technical field of decorative lamps, and in particular to a projection-based decorative lamp.

BACKGROUND

At present, during festivals or when creating a certain atmosphere, decorative lamps are commonly used as decorative items as their lighting effect can effectively improve the ambiance, enhance the decoration effect, and add a touch of liveliness to daily life. Chinese Utility Model Patent No. CN209180845U provides a multi-modal interactive pumpkin lamp, which includes a shell in the shape of a pumpkin head. Inside the shell, there is a lighting system, vibration system, power system, and control system. The lighting system, vibration system, and power system are electrically connected to the control system, respectively. The multi-modal interactive pumpkin lamp utilizes a control circuit board with preset mode programs. Different modes correspond to varying brightness levels of the LED beads, motor activation, and the on-off state of the MP3 play circuit. Users can switch between modes using a remote control. The infrared sensing device of the control circuit allows mode switching after detecting the button press, meeting the user's needs in different environments. However, this kind of pumpkin lamp is limited in its lighting effects as it can only adjust the brightness of the LED beads, lacking in amusement.

SUMMARY

Given the defects of the prior art, the present application aims to provide a projection-based decorative lamp that is more entertaining and enables interaction and variation of light and shadow.

The technical purpose of the present application is realized by the following technical solutions.

Provided is a projection-based decorative lamp, comprising a decorative shell, the decorative shell being made of translucent plastic material, and further comprising a projection assembly, the projection assembly being provided inside the decorative shell, wherein a first projection chamber and a second projection chamber are provided within the projection assembly; the first projection chamber comprises a first shape hole formed on a front wall and a first light source formed on a rear wall, and the second projection chamber comprises a second shape hole formed on a front wall and a second light source formed on a rear wall; the first light source illuminates the first shape hole to project a first shape onto the decorative shell, and the second light source illuminates the second shape hole to project a second shape onto the decorative shell; a center point of the first shape is the same as a center point of the second shape; the alternating switch of the first light source and/or the second light source enables the interaction and variation between the first shape and the second shape.

Furthermore, the second projection chamber and the first projection chamber are provided adjacently in a vertical arrangement; the first light source and the first shape hole are formed on a same horizontal line, forming a forward projection; the second light source is positioned horizontally higher than the second shape hole, forming a downward projection.

Furthermore, the second projection chamber and the first projection chamber are provided adjacently in a vertical arrangement; the first light source is positioned horizontally lower than the first shape hole, forming an upward projection; the second light source is positioned horizontally higher than the second shape hole, forming a downward projection.

Furthermore, the second projection chamber and the first projection chamber are provided adjacently in a vertical arrangement; the first light source is positioned horizontally lower than the first shape hole, forming an upward projection; the second light source and the second shape hole are formed on a same horizontal line, forming a forward projection.

Furthermore, the decorative shell is in a shape of a pumpkin, wherein the first shape hole represents an open-mouth shape, and the second shape hole represents a closed-mouth shape; the first shape and the second shape flash alternately to achieve a projection effect of opening and closing the mouth.

Furthermore, the projection-based decorative lamp further comprises a third projection chamber, wherein the third projection chamber is provided adjacently above the second projection chamber; third shape holes and a third light source are formed respectively on a front wall and a rear wall of the third projection chamber on a same horizontal line; the third light source illuminates the third shape holes to forwardly project a third shape onto the decorative shell.

Furthermore, the third shape holes consist of three triangles forming eyes and a nose.

Furthermore, the projection-based decorative lamp further comprises a circuit board, wherein the circuit board is installed on the projection assembly; several LED beads are provided on the circuit board, and the LED beads provide a projection light source for the projection assembly.

Furthermore, the circuit board is electrically connected with a wire, and the wire enables a series connection or a parallel connection of a plurality of projection assemblies.

Furthermore, a clamping piece is provided on an upper edge of the projection assembly; the clamping piece securely connects the projection assembly to an opening of the decorative shell provided outside the projection assembly.

In summary, the beneficial effects of the present application compared to the prior art are as follows: Through the alternating switch of the first light source and/or the second light source, the first shape and the second shape, projected respectively through the first shape hole and the second shape hole onto the same center point of the decorative shell, undergo interactions and variations. This enhances amusement and playfulness.

DETAILED DESCRIPTION OF THE EMBODIMENTS

Figure 1:
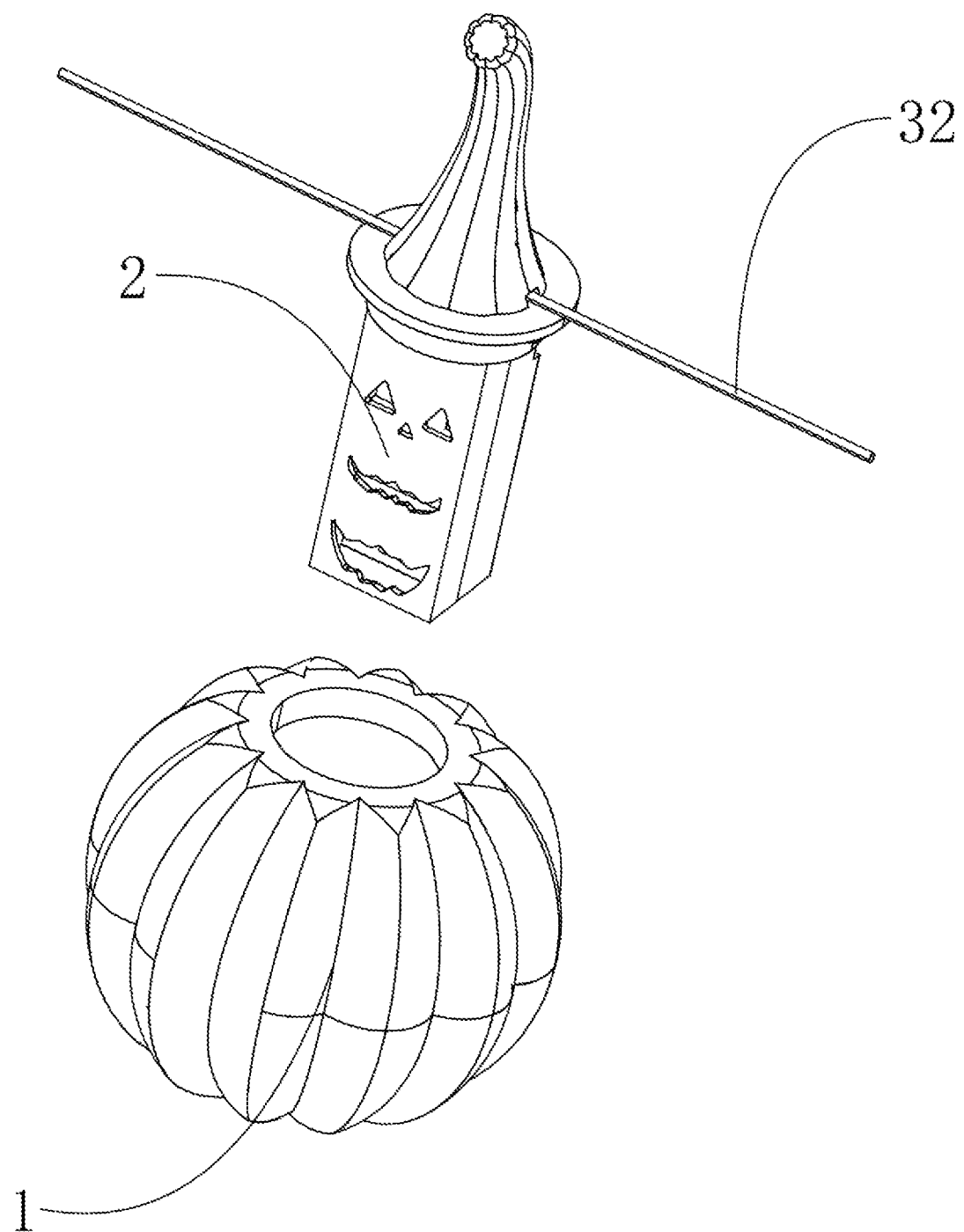
FIG. 1 is a schematic diagram of the exploded structure according to the embodiment.
Figure 2:
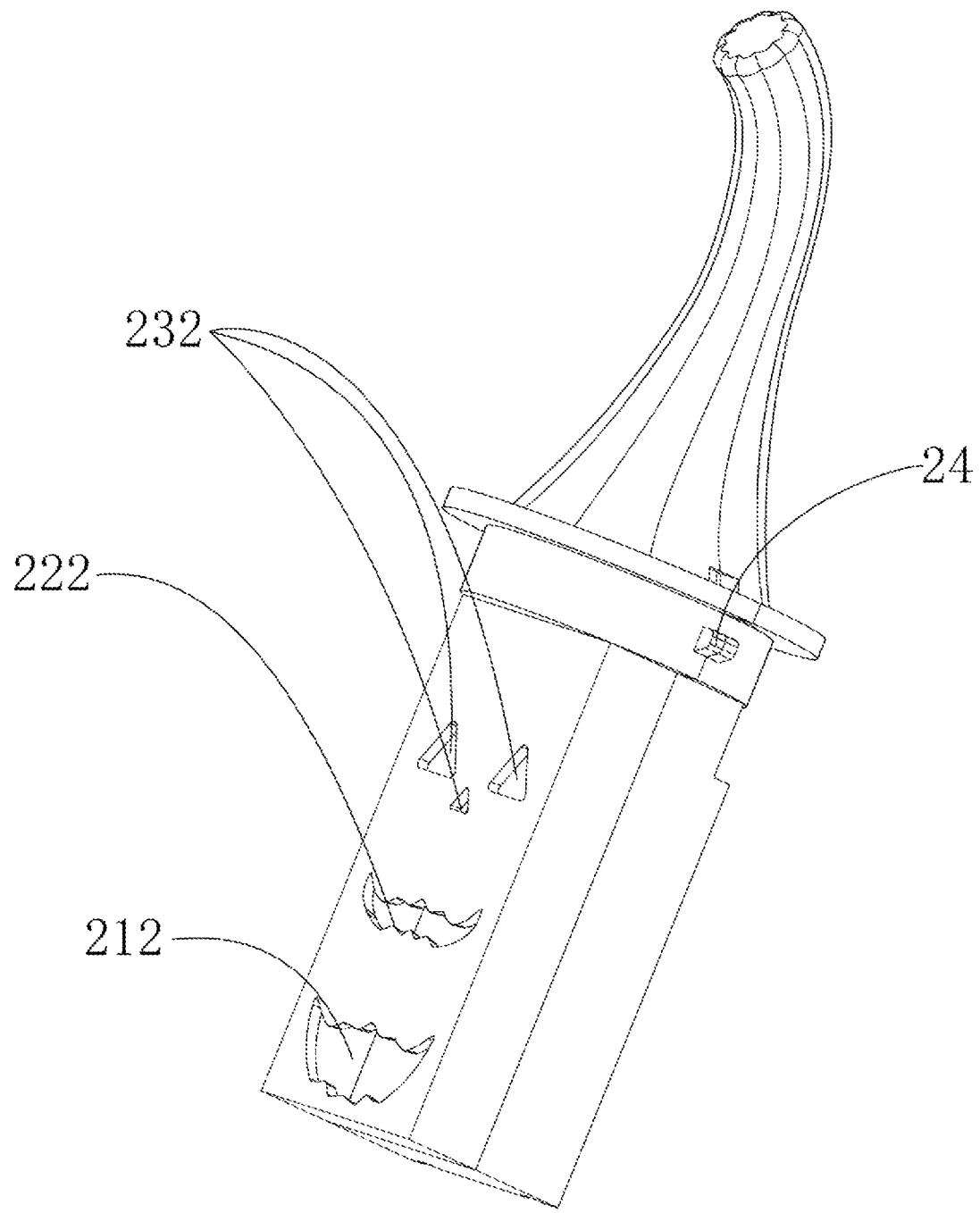
FIG. 2 is a structural schematic diagram of the projection assembly.
Figure 3:
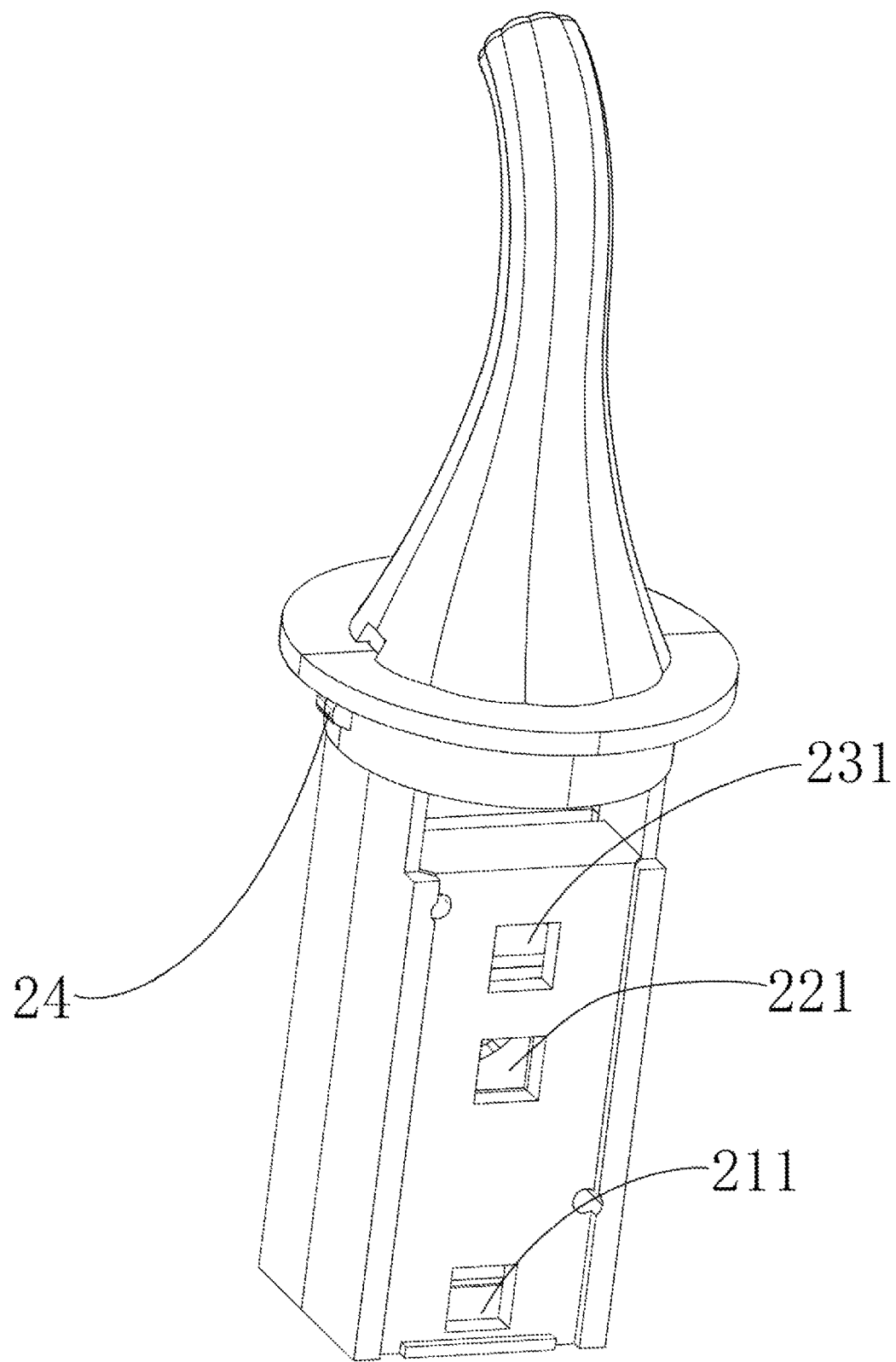
FIG. 3 is another structural schematic diagram of the projection assembly.
Figure 4:
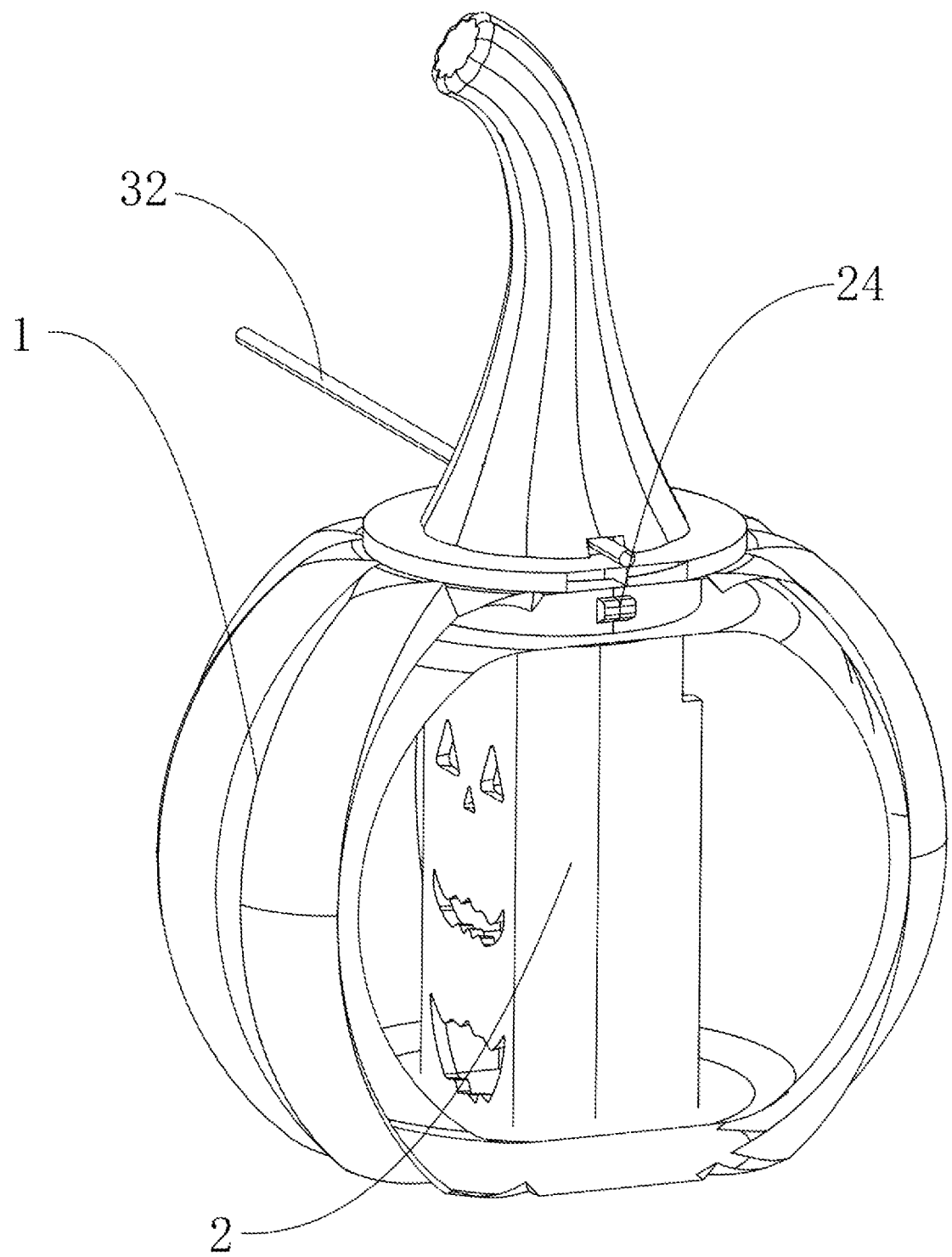
FIG. 4 is a schematic diagram of the sectional structure according to the embodiment.
Figure 5:
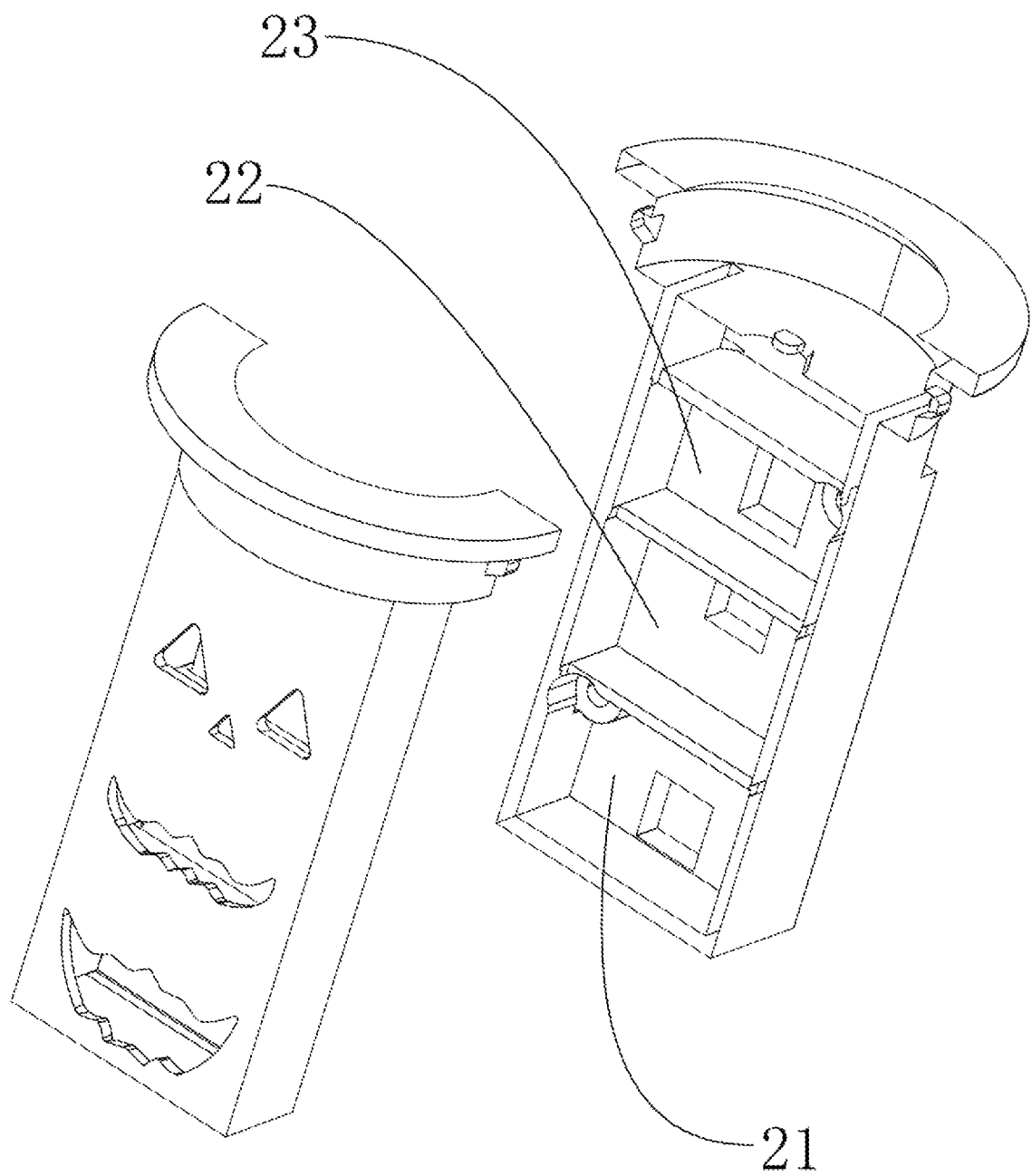
FIG. 5 is a schematic diagram of the exploded structure of the projection assembly.

In the description of the present application, it should be noted that directions or positional relationships indicated by terms such as "upper", "lower", "inside", "outside", "front", "rear" and the like are those shown based on the drawings. These terms are merely intended to facilitate and simplify the description of the present application, rather than to indicate or imply that the indicated device or element must have a specific direction and be structured and operated according to the specific direction. Therefore, these terms should not be construed as limiting the present application.

The following is a further detailed description of the present application with reference to the drawings.

A projection-based decorative lamp, as shown in FIGS. 1-11, comprises a decorative shell 1. The decorative shell 1 is made of translucent plastic material, which can facilitate connection and installation and is cost-effective. The translucent nature of the plastic material enables the projected shapes to be visible from the outside. The projection-based decorative lamp further comprises a projection assembly 2. The projection assembly 2 generates projection and projects it onto the decorative shell 1. The projection assembly 2 is preferably in the form of a rectangular prism, and the projection assembly 2 is provided inside the decorative shell 1, preferably at the center of the decorative shell 1. A first projection chamber 21 and a second projection chamber 22 are provided within the projection assembly 2. Preferably, the first projection chamber 21 and the second projection chamber 22 are provided adjacently, with a partition plate provided therebetween to separate their individual light. The first projection chamber 21 comprises a first shape hole 212 formed on the front wall and a first light source 211 formed on the rear wall, and the second projection chamber 22 comprises a second shape hole 222 formed on the front wall and a second light source 221 formed on the rear wall. The first light source 211 illuminates the first shape hole 212 to project a first shape 51 onto the decorative shell 1, and the second light source 221 illuminates the second shape hole 222 to project a second shape 52 onto the decorative shell 1. The center point of the first shape 51 is the same as the center point of the second shape 52. The alternating switch of the first light source 211 and/or the second light source 221 enables the interaction and variation between the first shape 51 and the second shape 52. Such interaction and variation can involve an alternating projection between the first shape 51 and the second shape 52, for example, projecting an open-mouth shape and a closed-mouth shape alternately to create a dynamic laughing expression. It can also involve one of the shapes remaining illuminated while the other projected shape undergoes on-off changes. For example, the open-mouth shape remains illuminated while the projected two-front-teeth shape undergoes on-off changes, creating an expression effect where the projected teeth appear and disappear alternately.

Figure 6:
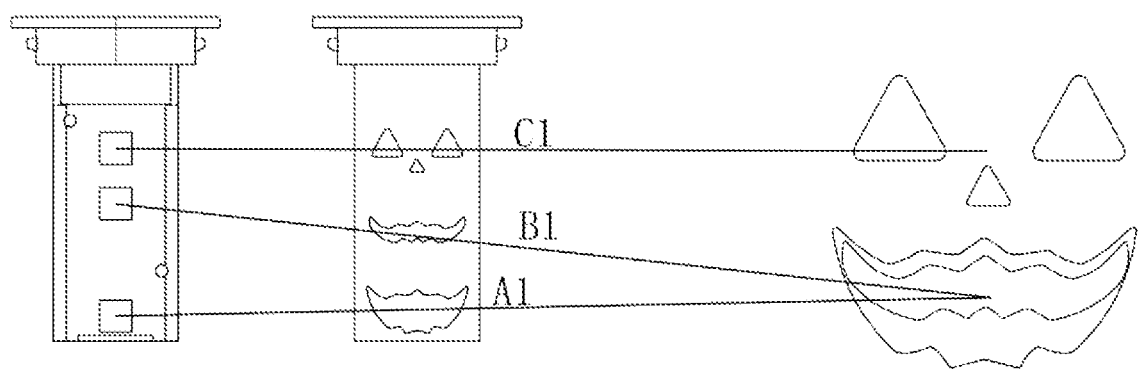
FIG. 6 shows the projection mode according to the first embodiment.

When the second projection chamber 22 and the first projection chamber 21 are provided adjacently in a vertical arrangement, to achieve the projection effect where the center point of the first shape 51 is the same as the center point of the second shape 52, there are three embodiments to realize it:

In the first embodiment, as shown in FIG. 6, the first light source 211 and the first shape hole 212 are formed on the same horizontal line, forming a forward projection represented by the horizontal projection line A1 in the figure. In this case, the first shape hole 212 projects onto the decorative shell 1 to form the first shape 51. The second light source 221 is positioned horizontally higher than the second shape hole 222, forming a downward projection represented by the downwardly inclined projection line B1 in the figure. In this case, the second shape hole 222 projects onto the decorative shell 1 at the same center point as the first shape 51 to form the second shape 52.

Figure 7:
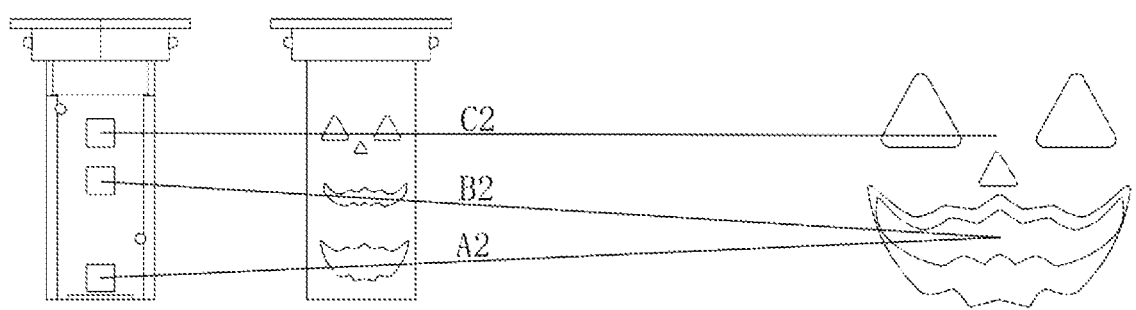
FIG. 7 shows the projection mode according to the second embodiment.

In the second embodiment, as shown in FIG. 7, the first light source 211 is positioned horizontally lower than the first shape hole 212, forming an upward projection represented by the upwardly inclined projection line A2 in the figure. In this case, the first shape hole 212 projects onto the decorative shell 1 to form the first shape 51. The second light source 221 is positioned horizontally higher than the second shape hole 222, forming a downward projection represented by the downwardly inclined projection line B2 in the figure. In this case, the second shape hole 222 projects onto the decorative shell 1 at the same center point as the first shape 51 to form the second shape 52.

In the third embodiment, the first light source 211 is positioned horizontally lower than the first shape hole 212, forming an upward projection represented by the upwardly inclined projection line A3 in the figure. In this case, the first shape hole 212 projects onto the decorative shell 1 to form the first shape 51. The second light source 221 and the second shape hole 222 are formed on the same horizontal line, forming a forward projection represented by the horizontal projection line B3 in the figure. In this case, the second shape hole 222 projects onto the decorative shell 1 at the same center point as the first shape 51 to form the second shape 52.

Figure 8:
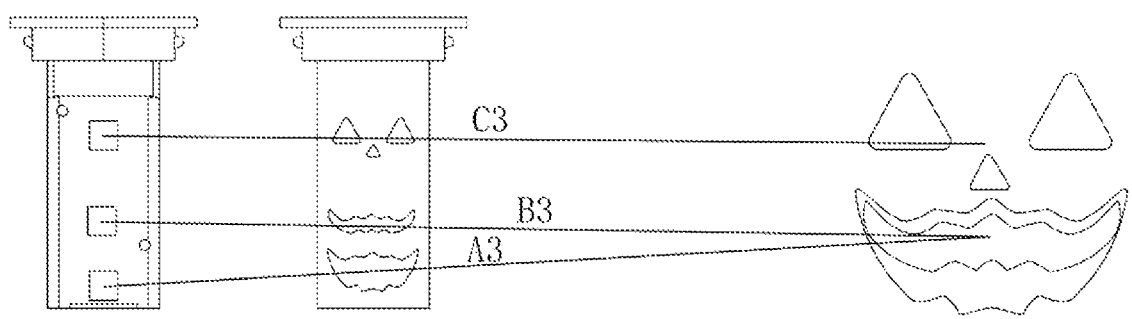
FIG. 8 shows the projection mode according to the third embodiment.

To further enrich the amusement and variability of the projected shapes on the decorative shell 1, a third projection chamber 23 can be further provided on the projection assembly 2. The third projection chamber 23 is provided adjacently above the second projection chamber 22. Third shape holes 232 and a third light source 231 are formed respectively on the front wall and the rear wall of the third projection chamber 23 on the same horizontal line. As shown in FIGS. 6-8, the third light source 231 illuminates the third shape holes 232 to forwardly project (represented by the horizontal projection lines C1, C2, and C3 in the figures) a third shape 53 onto the decorative shell 1.

Preferably, in the above embodiments, the decorative shell 1 is in the shape of a pumpkin, wherein the first shape hole 212 represents an open-mouth shape, and the second shape hole 222 represents a closed-mouth shape; the first shape 51 and the second shape 52 flash alternately to achieve the projection effect of opening and closing the mouth; the third shape holes 232 consist of three triangles forming eyes and a nose. By maintaining constant illumination of the eyes and nose, the alternating on-off changes of the projected open-mouth and closed-mouth shapes can generate a variety of expression changes. When combined with eerie music and other sound effects, it can create a fun or a spooky effect in a Halloween setting, effectively enhancing the festive atmosphere.

Certainly, the above-mentioned technical solution of the first shape 51 and the second shape 52 as well as the technical solution of the combination of the first shape and the second shape with the third shape 53 are also applicable to other situations. It only requires designing the shapes of the shapes appropriately to generate entertaining effects through interactive projection. Additionally, the light sources and shape holes can also be provided in multiple sets as needed.

Figure 9:
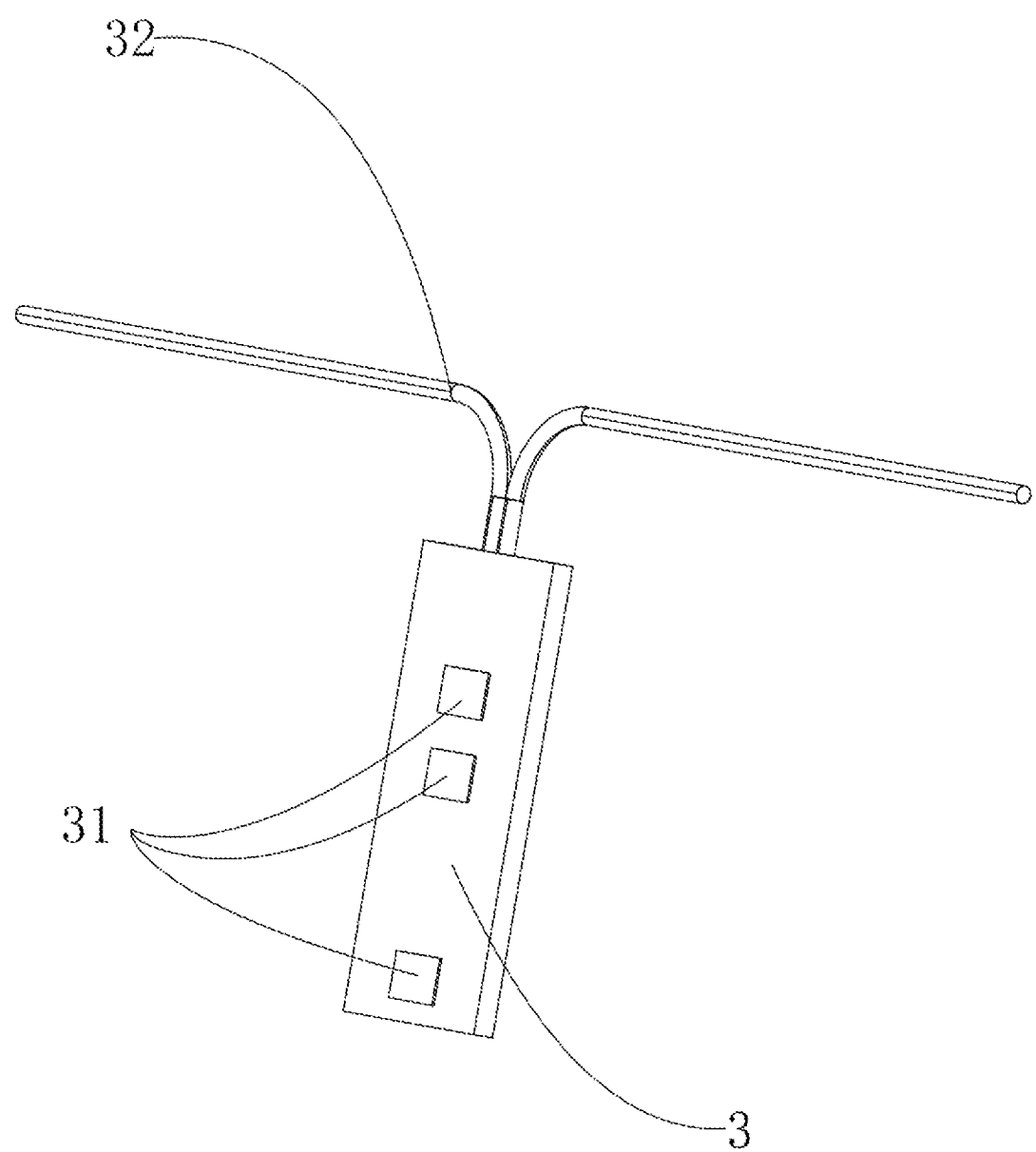
FIG. 9 is a schematic diagram of the circuit board structure.
Figure 10:
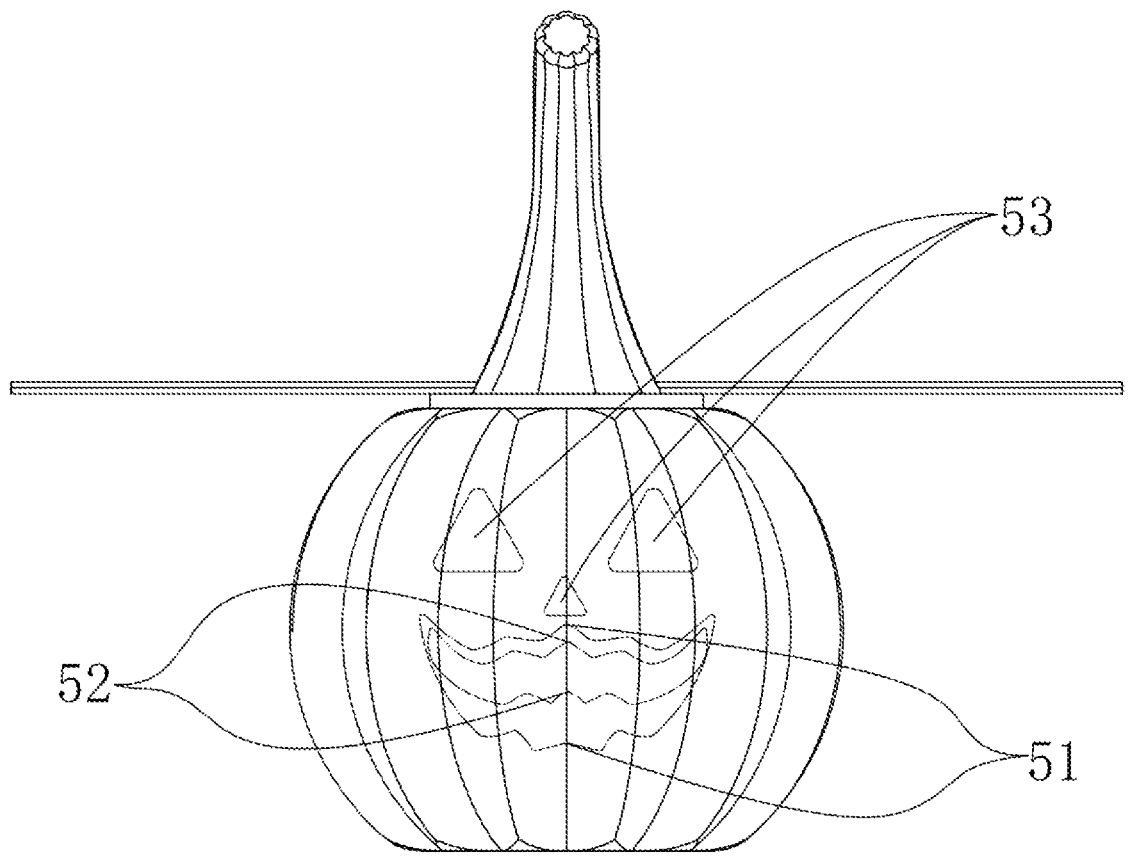
FIG. 10 is a schematic diagram of the projection effect.
Figure 11:
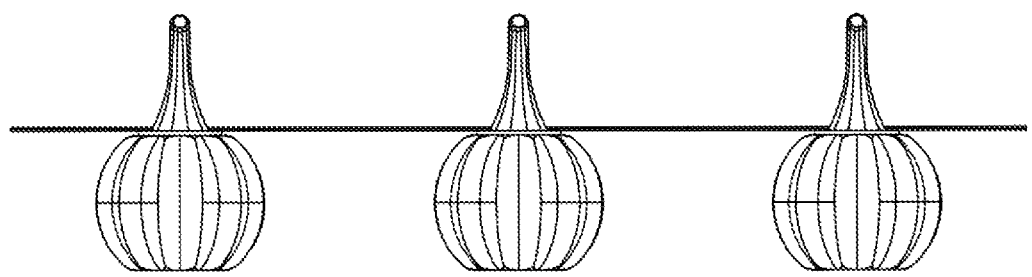
FIG. 11 is a schematic diagram of the string light.

The light source for projection can use the incandescent lamp, halogen lamp, or other lighting methods that come with the projection assembly 2 according to the size of the decorative shell 1 and the intended usage scenario. When a string light configuration is desired and the volume of the decorative shell 1 is small, as shown in FIGS. 9 and 11, a circuit board 3 can be provided on the projection assembly 2. Several LED beads 31 are provided on the circuit board 3, and the LED beads 31 provide a projection light source for the projection assembly 2. The circuit board 3 is electrically connected to a wire 32, and the wire 32 enables a series connection or a parallel connection of a plurality of the projection assemblies 2 to create a connection for a plurality of decorative lamps, forming a string of decorative lamps.

Additionally, the decorative shell 1 and the projection assembly 2 can be integrated as a single unit or set up separately and fitted together through plastic malleability. To further enhance stability, a clamping piece 24 can be provided on the upper edge of the projection assembly 2; the clamping piece 24 securely connects the projection assembly 2 to the opening of the decorative shell 1 provided outside the projection assembly.

From the above description, it can be seen that the embodiments described above achieve the following technical effects: the alternating switch of the first light source and the second light source. The alternating switch of the first light source or the second light source, in conjunction with the action of the first shape hole and the second shape hole, causes the first shape and the second shape to interact and appear or disappear dynamically at the same center point on the decorative shell through the presence or absence of projected light. This enhances amusement, intensifies the sense of celebration or ambiance, and serves as a means of entertainment.

The above description is intended to be exemplary embodiments of the present application and does not limit the scope of protection of the present application. The scope of protection is determined by the appended claims.

What is claimed is:

1. A projection-based decorative lamp, comprising a decorative shell, the decorative shell being made of a translucent plastic material, and further comprising a projection assembly, the projection assembly being provided inside the decorative shell, wherein a first projection chamber and a second projection chamber are provided within the projection assembly; the first projection chamber comprises a first shape hole formed on a front wall and a first light source formed on a rear wall, and the second projection chamber comprises a second shape hole formed on a front wall and a second light source formed on a rear wall; the first light source illuminates the first shape hole to project a first shape onto the decorative shell, and the second light source illuminates the second shape hole to project a second shape onto the decorative shell; a center point of the first shape is the same as a center point of the second shape; an alternating switch of the first light source and/or the second light source enables the interaction and variation between the first shape and the second shape;

wherein the decorative shell is in a shape of a pumpkin, the first shape hole represents an open-mouth shape, and the second shape hole represents a closed-mouth shape; the first shape and the second shape flash alternately to achieve a projection effect of opening and closing the mouth;

wherein the projection-based decorative lamp further comprises a third projection chamber, wherein the third projection chamber is provided adjacently above the second projection chamber; third shape holes and a third light source are formed respectively on a front wall and a rear wall of the third projection chamber on a same horizontal line; the third light source illuminates the third shape holes to forwardly project a third shape onto the decorative shell.

2. The projection-based decorative lamp according to claim 1, wherein the second projection chamber and the first projection chamber are provided adjacently in a vertical arrangement; the first light source and the first shape hole are formed on a same horizontal line, forming a forward projection; the second light source is positioned horizontally higher than the second shape hole, forming a downward projection.

3. The projection-based decorative lamp according to claim 1, wherein the second projection chamber and the first projection chamber are provided adjacently in a vertical arrangement; the first light source is positioned horizontally lower than the first shape hole, forming an upward projection; the second light source is positioned horizontally higher than the second shape hole, forming a downward projection.

4. The projection-based decorative lamp according to claim 1, wherein the second projection chamber and the first projection chamber are provided adjacently in a vertical arrangement; the first light source is positioned horizontally lower than the first shape hole, forming an upward projection; the second light source and the second shape hole are formed on a same horizontal line, forming a forward projection.

5. The projection-based decorative lamp according to claim 1, wherein the third shape holes consist of three triangles forming eyes and a nose.

6. The projection-based decorative lamp according to claim 5, further comprising a circuit board, wherein the circuit board is installed on the projection assembly; several LED beads are provided on the circuit board, and the LED beads provide a projection light source for the projection assembly.

7. The projection-based decorative lamp according to claim 6, wherein the circuit board is electrically connected with a wire, and the wire enables a series connection or a parallel connection of a plurality of the projection assemblies.

8. The projection-based decorative lamp according to claim 7, wherein a clamping piece is provided on an upper edge of the projection assembly; the clamping piece securely connects the projection assembly to an opening of the decorative shell provided outside the projection assembly.

* * * * *